(12) United States Patent
Kohzuki et al.

(10) Patent No.: US 9,187,658 B2
(45) Date of Patent: Nov. 17, 2015

(54) PHOTOPOLYMERIZABLE INKJET INK, INK CARTRIDGE, AND INKJET RECORDING DEVICE (71) Applicants: Shizuka Kohzuki, Kanagawa (JP); Takao Hiraoka, Kanagawa (JP)

(72) Inventors: Shizuka Kohzuki, Kanagawa (JP); Takao Hiraoka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/310,452

(22) Filed: Jun. 20, 2014

(65) Prior Publication Data

US 2015/0009265 A1    Jan. 8, 2015

(30) Foreign Application Priority Data

Jul. 5, 2013    (JP) .................. 2013-141287

(51) Int. Cl.
  *C08F 2/50*    (2006.01)
  *C08F 2/46*    (2006.01)
  *C08G 61/04*    (2006.01)
  *C09D 11/101*    (2014.01)
  *C09D 11/30*    (2014.01)
  *C09D 11/38*    (2014.01)

(52) U.S. Cl.
  CPC .............. *C09D 11/101* (2013.01); *C09D 11/30* (2013.01); *C09D 11/38* (2013.01)

(58) Field of Classification Search
  CPC .............................. C09D 11/101; C09D 11/30
  USPC ............. 522/6, 36, 33, 1, 71, 189, 184; 520/1
  See application file for complete search history.

(56) References Cited

U.S. PATENT DOCUMENTS

| | | | |
|---|---|---|---|
| 8,632,174 B2 | 1/2014 | Noguchi et al. | |
| 2005/0239971 A1* | 10/2005 | Husler et al. | 525/293 |
| 2008/0213518 A1* | 9/2008 | Oyanagi et al. | 428/34.1 |
| 2009/0087627 A1* | 4/2009 | Watanabe et al. | 428/195.1 |
| 2012/0147103 A1 | 6/2012 | Hasegawa et al. | |
| 2012/0176456 A1 | 7/2012 | Maekawa et al. | |
| 2012/0200648 A1 | 8/2012 | Hiraoka et al. | |
| 2012/0242768 A1 | 9/2012 | Seno et al. | |
| 2012/0293589 A1 | 11/2012 | Hiraoka | |
| 2013/0065024 A1 | 3/2013 | Aruga et al. | |
| 2013/0321539 A1 | 12/2013 | Hiraoka | |
| 2015/0042731 A1* | 2/2015 | Hiraoka | 347/86 |

FOREIGN PATENT DOCUMENTS

| | | |
|---|---|---|
| JP | 2005-533156 | 11/2005 |
| JP | 2012-140593 | 7/2012 |
| JP | 2012-251123 | 12/2012 |
| JP | 2013-129699 | * 9/2013 |
| WO | WO2012/153867 A1 | 11/2012 |

* cited by examiner

*Primary Examiner* — Ling Choi
*Assistant Examiner* — Jessica E Whiteley
(74) *Attorney, Agent, or Firm* — Oblon, McClelland, Maier & Neustadt, L.L.P.

(57) ABSTRACT

To provide a photopolymerizable inkjet ink including: diethylene glycol dimethacrylate; caprolactone-modified dipentaerythritol hexaacrylate; and a photopolymerization initiator represented by the following general formula (1):

General Formula (1)

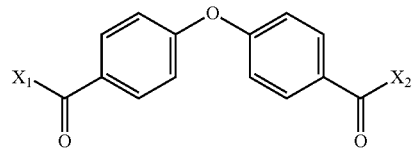

where $X_1$ is represented by the following general formula (1-1), and $X_2$ is represented by the following general formula (1-2):

General Formula (1-1)

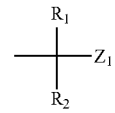

General Formula (1-2)

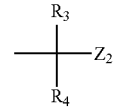

where $R_1$ to $R_4$ are each independently a C1-C6 alkyl group, and $R_1$ and $R_2$ may be linked to form a ring, and $R_3$ and $R_4$ may be linked to form a ring; $Z_1$ and $Z_2$ is —$NR_5R_6$ or $OR_7$; $R_5$ and $R_6$ are each independently a C1-C6 alkyl group, and $R_5$ and $R_6$ may be linked to form a ring; and $R_7$ is a hydrogen atom, a methyl group, or a trimethylsilyl group.

6 Claims, 2 Drawing Sheets

PHOTOPOLYMERIZABLE INKJET INK, INK CARTRIDGE, AND INKJET RECORDING DEVICE

BACKGROUND OF THE INVENTION

1. Field of the Invention

The present invention relates to a photopolymerizable inkjet ink, an ink cartridge, and an inkjet recording device.

2. Description of the Related Art

Inkjet printing has been conventionally widely known. The characteristics thereof are high use efficiency of materials, as it is a material addition printing type, low cost, and energy-saving and resource-saving production. Therefore, there is a great expectation for the inkjet printing as a production technique, which can reduce environmental load. Moreover, the inkjet printing can be performed on various media, as it is a non-contact printing system. Therefore, applications of the inkjet printing to various fields are expected.

Recently, in the inkjet system, a photopolymerizable inkjet technique using an ink containing a photopolymerization initiator and a polymerizable compound has been developed. In a typical system of this technique, an ink is fixed on a medium by applying UV light from a UV lamp just after printing to cure the ink. Therefore, the speed for drying and fixing is fast compared to an aqueous ink or a solvent-based ink, and high speed printing can be achieved using the photopolymerizable inkjet ink.

A main stream of a photopolymerizable inkjet ink used in the aforementioned system is a non-aqueous 100%-solid ink containing a photopolymerization initiator, which generates free radicals upon application of UV light, and an acryl-based compound. Therefore, this ink can be applied for a material of non-absorption nature, and does not use a large amount of an organic solvent as in a solvent-based ink, and thus safety in printing scene is maintained or environmental load can be reduced. For these reasons, importance of the photopolymerizable inkjet ink is increased even more.

Meanwhile, a majority of polymerizable compounds used in conventional photopolymerizable inkjet inks are toxic. Most of (meth)acrylic acid esters, which are readily available with low cost, have high toxicity in terms of skin sensitivity, which causes allergy reactions with skin upon contact with them. Conventional art has not yet provided any solution to this problem.

Based on the studies conducted so far, the present inventors have found a few (meth)acryl amides, which have no problem in skin sensitization, through a resulting ink has not excellent curing ability. As for one of examples thereof, proposed is a photopolymerizable inkjet ink containing methacrylate as a main component, as methacrylate is lower in toxicity in terms of skin sensitization than acrylate (see Japanese Patent Application Laid-Open (JP-A) Nos. 2012-251123 and 2012-140593).

Moreover, curability of a photopolymerizable inkjet ink also largely depends on reactivity of a photopolymerization initiator to be contained. Therefore, disclosed is a photopolymerizable inkjet ink containing a photopolymerization initiator, which can give sufficient curability and improve odor, through there is a problem in safety (see JP-A No. 2005-533156.

Curability can be improved by increasing an amount of a photopolymerization initiator. However, use of an excessive amount of a photopolymerization initiator is not preferable, because the photopolymerization initiator may cause odor after curing or yellowing. Moreover, curability can be improved by increasing an exposure dose of UV light. However, it may adversely affect the production process, as radiation duration is extended, or a plurality of irradiation devices is used. Therefore, there is a need for a photopolymerizable inkjet ink, which can achieve sufficient curability with a small amount of a photopolymerization initiator, and has excellent efficiency.

When a conventional photopolymerization initiator is used, moreover, there are various problems, other than curability. Especially, odor caused by a decomposed product of a photopolymerization initiator after applying UV light, and yellowing of a coating film are recently very serious problems in the production site. These may not only deteriorate the properties of a coat, but also impairs working environment.

Therefore, improvements in the aforementioned odor and yellowing of the coating film are urgent tasks.

SUMMARY OF THE INVENTION

The present invention aims to provide a photopolymerizable inkjet ink, which has excellent curing ability, forms a film that has less odor and yellowing, and has high safety.

The means for solving the aforementioned problems are as follow:

The photopolymerizable inkjet ink of the present invention contains:

diethylene glycol dimethacrylate;
caprolactone-modified dipentaerythritol hexaacrylate; and
a photopolymerization initiator represented by the following general formula (1):

General Formula (1)

where $X_1$ is represented by the following general formula (1-1), and $X_2$ is represented by the following general formula (1-2);

General Formula (1-1)

General Formula (1-2)

where $R_1$ to $R_4$ are each independently a C1-C6 alkyl group, and $R_1$ and $R_2$ may be linked to form a ring, and $R_3$ and $R_4$ may be linked to form a ring; $Z_1$ and $Z_2$ is —$NR_5R_6$ or $OR_7$; $R_5$ and $R_6$ are each independently a C1-C6 alkyl group, and $R_5$ and $R_6$ may be linked to form a ring; and $R_7$ is a hydrogen atom, a methyl group, or a trimethylsilyl group.

The present invention can solve the aforementioned various problems in the art, and can provide a photopolymerizable inkjet ink, which has excellent curing ability, forms a film that has less odor and yellowing, and has high safety.

DETAILED DESCRIPTION OF THE INVENTION (Photopolymerizable Inkjet Ink)

The photopolymerizable inkjet ink of the present invention contains diethylene glycol dimethacrylate, caprolactone-modified dipentaerythritol hexaacrylate, and a photopolymerization initiator represented by the following general formula (1), and may further contain other components.

General Formula (1)

In the general formula (1), $X_1$ is represented by the following general formula (1-1), and $X_2$ is represented by the following general formula (1-2):

General Formula (1-1)

General Formula (1-2)

In the general formulae (1-1) and (1-2), $R_1$ to $R_4$ are each independently a C1-C6 alkyl group, and $R_1$ and $R_2$ may be linked to form a ring, and $R_3$ and $R_4$ may be linked to form a ring; $Z_1$ and $Z_2$ is —$NR_5R_6$ or $OR_7$; $R_5$ and $R_6$ are each independently a C1-C6 alkyl group, and $R_5$ and $R_6$ may be linked to form a ring; and $R_7$ is a hydrogen atom, a methyl group, or a trimethylsilyl group.

In the present invention, diethylene glycol dimethacrylate and caprolactone-modified dipentaerythritol hexaacrylate are used as photopolymerizable monomers that are negative for skin sensitization, and a photopolymerizable inkjet ink containing a photopolymerization initiator represented by the general formula (1) is used. Therefore, a photopolymerizable inkjet ink, which has low viscosity and high curing ability, forms a film that has less odor or yellowing, and has high safety, can be provided.

The diethylene glycol dimethacrylate may be appropriately synthesized for use, or selected from commercial products. Examples of the commercial product thereof include "2G" manufactured by Shin-Nakamura Chemical Co., Ltd.

The caprolactone-modified dipentaerythritol hexaacrylate may be appropriately synthesized for use, or selected from commercial products. Examples of the commercial product thereof include "DPCA60" manufactured by NIPPON KAYAKU Co., Ltd.

An amount of the caprolactone-modified dipentaerythritol hexaacrylate is preferably 30 parts by mass to 50 parts by mass, relative to 100 parts by mass of a total amount of the photopolymerizable monomers. When the amount thereof is smaller than 30 parts by mass, it may be difficult to cure with the predetermined quantity of light. When the amount thereof is greater than 50 parts by mass, a resulting ink may have a high viscosity to the degree that the ink cannot be ejected by inkjetting.

A mass ratio (A:B) of the diethylene glycol dimethacrylate (A) to the caprolactone-modified dipentaerythritol hexaacrylate (B) is preferably 50:50 to 70:30.

Here, the photopolymerizable monomer negative for skin sensitization refers to a compound that satisfies at least one of the following skin sensitization evaluations (1) to (3).

(1) A compound having a Stimulation Index (SI value) of less than 3, where the Stimulation Index indicates the level of sensitization as measured by a skin sensitization test based on the LLNA (Local Lymph Node Assay).

(2) A compound evaluated as "negative for skin sensitization" or "no skin sensitization" in its material safety data sheet (MSDS).

(3) A compound evaluated as "negative for skin sensitization" or "no skin sensitization" in the literature [e.g., Contact Dermatitis 8 223-235 (1982)].

Regarding the above (1), the compound having a SI value of less than 3 is considered negative for skin sensitization as described in literatures, for example, "Functional Material" (Kino Zairyou) 2005, September, Vol. 25, No. 9, p. 55. The lower SI value means lower skin sensitization. Thus, in the present invention, a monomer having lower SI value is preferably used. The SI value of the monomer used is less than 3, preferably 2 or lower, more preferably 1.6 or lower.

The SI value of the diethylene glycol dimethacrylate ("2G" manufactured by Shin-Nakamura Chemical Co., Ltd.) is 1.1.

The SI value of the caprolactone-modified dipentaerythritol hexaacrylate ("DPCA60" manufactured by NIPPON KAYAKU Co., Ltd.) is 1.0.

Note that, the following (meth)acrylates, (meth)acryl amides, and vinyl ethers can be used in combination, as long as a resulting ink does not have a problem of skin sensitization, even through they have a problem of skin sensitization in some degree when used alone, or skin sensitization thereof is not confirmed. Specific examples thereof include ethylene glycol di(meth)acrylate, hydroxy pivalic acid neopentyl glycol di(meth)acrylate, γ-butyrolactone acrylate, isobornyl (meth)acrylate, formulated trimethylol propane mono(meth)acrylate, polytetramethylene glycol di(meth)acrylate, trimethylol propane (meth)acrylic acid benzoate, diethylene glycol diacrylate, triethylene glycol di(meth)acrylate, tetraethylene glycol di(meth)acrylate, polyethylene glycol di(meth)acrylate [$CH_2$=CH—CO—$(OC_2H_4)_n$—OCOCH=$CH_2$ (n≈4)], [$CH_2$=CH—CO—$(OC_2H_4)_n$—OCOCH=$CH_2$ (n≈9)], [$CH_2$=CH—CO—$(OC_2H_4)_n$—OCOCH=$CH_2$ (n≈14)], [$CH_2$=CH—CO—$(OC_2H_4)_n$—OCOCH=$CH_2$ (n≈23)], dipropylene glycol di(meth)acrylate, tripropylene glycol di(meth)acrylate, polypropylene glycol dimethacrylate [$CH_2$=C($CH_3$)—CO—$(OC_3H_6)_n$—OCOC($CH_3$)=$CH_2$ (n≈7)], 1,3-dibutanediol diacrylate, 1,4-dibutanediol di(meth)acrylate, 1,6-hexanediol di(meth)acrylate, 1,9-nonanediol di(meth)acrylate, neopentyl glycol di(meth)acrylate, tricyclodecane dimethanol di(meth)acrylate, propylene oxide-modified bisphenol A di(meth)acrylate, polyethylene glycol di(meth)acrylate, dipentaerythritol hexa(meth)acrylate, (meth)acryloyl morpholine, 2-hydroxypropyl(meth)acryl amide, propylene oxide-modified tetramethylol methane tetra(meth)acrylate, dipentaerythritol hydroxypenta(meth)acrylate, caprolactone-modified dipentaerythritol hydroxy penta(meth)acrylate, ditrimethylol propane tetra(meth)acrylate, pentaerythritol tetra(meth)acrylate, trimethylol propane triacrylate, ethylene oxide-modified trimethylol propane triacrylate, propylene oxide-modified trimethylol propane tri(meth)acrylate, caprolactone-modified trimethylol propane tri(meth)acrylate, pentaerythritol tri(meth)acrylate, tris(2-hydroxyethyl)isocyanurate tri(meth)acrylate, ethoxylated neopentyl glycol di(meth)acrylate, propylene oxide-modified neopentylglycol di(meth)acrylate, propylene oxide-modified glyceryl tri(meth)acrylate, polyester di(meth)acrylate, polyester tri(meth)acrylate, polyester tetra(meth)acrylate, polyester penta(meth)acrylate, polyester poly(meth)acrylate, N-vinyl caprolactam, N-vinyl pyrrolidone, N-vinyl formamide, polyurethane di(meth)acrylate, polyurethane tri(meth)acrylate, polyurethane tetra(meth)acrylate, polyurethane penta(meth)acrylate, polyurethane poly(meth)acrylate, cyclohexane dimethanol divinyl ether, cyclohexane dimethanol monovinyl ether, hydroxyethyl vinyl ether, diethylene glycol monovinyl ether, diethylene glycol divinyl ether, dicyclopentadiene vinyl ether, tricyclodecane vinyl ether, benzyl vinyl ether, and ethyloxetane methyl vinyl ether.

As for the vinyl ether negative for skin sensitization, other than those listed above, there are triethylene glycol divinyl ether, hydroxybutyl vinyl ether, and ethyl vinyl ether. Among them, preferred is triethylene glycol divinyl ether, as it has a viscosity that is sufficiently low, and has a boiling point that is not too low, and therefore it is easily handled at ambient temperature and pressure.

<Photopolymerization Initiator>

The photopolymerization initiator is a compound represented by the following general formula (1).

General Formula (1)

In the general formula (1) above, $X_1$ is represented by the general formula (1-1), and $X_2$ is represented by the general formula (1-2).

General Formula (1-1)

General Formula (1-2)

In the general formulae (1-1) and (1-2) above, $R_1$ to $R_4$ are each independently a C1-C6 alkyl group, and $R_1$ and $R_2$ may be linked to form a ring, and $R_3$ and $R_4$ may be linked to form a ring; $Z_1$ and $Z_2$ is —$NR_5R_6$ or $OR_7$; $R_5$ and $R_6$ are each independently a C1-C6 alkyl group, and $R_5$ and $R_6$ may be linked to form a ring; and $R_7$ is a hydrogen atom, a methyl group, or a trimethylsilyl group.

The C1-C6 alkyl group for $R_1$ to $R_4$ is a chain, branched, or cyclic C1-C6 alkyl group. Examples thereof include a methyl group, an ethyl group, and a propyl group. $R_1$ and $R_2$ may form a ring together, and $R_3$ and $R_4$ may be linked to form a ring.

The C1-C6 alkyl group for $R_5$ and $R_6$ is a chain, branched, or cyclic C1-C6 alkyl group. Examples thereof include a methyl group, an ethyl group, and a propyl group. $R_5$ and $R_6$ may be linked to form a ring.

Specific structures of the photopolymerization initiator are listed below, but the photopolymerization initiator for use in the present invention is not limited to the specific examples below.

Among them, the photopolymerization initiators represented by the following structural formulae are preferred.

The polymerization initiator represented by the general formula (1) is extremely highly effective compared to a photopolymerization initiator used in a conventional photopolymerizable inkjet ink, such as IRGACURE 184 (manufactured by BASF).

An amount of the photopolymerization initiator represented by the general formula (1) is appropriately selected depending on the intended purpose without any limitation, but the amount thereof is preferably 10 parts by mass to 20 parts by mass, relative to 100 parts by mass of a total amount of the photopolymerizable monomers. When the amount thereof is smaller than 10 parts by mass, sufficient curing ability of a coated film may not be attained. When the amount thereof is greater than 20 parts by mass, light fastness is impaired so that yellowing may occur in the coated film.

<Other Components>

Examples of other components include a colorant, a polymerization inhibitor, a surfactant, and a photosensitizer.

<<Colorant>>

As for the colorant, an inorganic pigment, or an organic pigment can be used. Note that, various inorganic pigments or organic pigments can be used depending on the need, considering physical properties of a resulting ink.

As for the black pigment, for example, carbon black produced by a furnace method or a channel method can be used.

Examples of the yellow pigment include pigments of Pigment Yellow series, such as Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 114, Pigment Yellow 120, Pigment Yellow 128, Pigment Yellow 129, Pigment Yellow 138, Pigment Yellow 150, Pigment Yellow 151, Pigment Yellow 154, Pigment Yellow 155, and Pigment Yellow 180.

Examples of the magenta pigment include pigments of Pigment Red series, such as Pigment Red 5, Pigment Red 7, Pigment Red 12, Pigment Red 48(Ca), Pigment Red 48(Mn), Pigment Red 57(Ca), Pigment Red 57:1, Pigment Red 112, Pigment Red 122, Pigment Red 123, Pigment Red 168, Pigment Red 184, Pigment Red 202, and Pigment Violet 19.

Examples of the cyan pigment include pigments of Blue series, such as Pigment Blue 1, Pigment Blue 2, Pigment Blue 3, Pigment Blue 15, Pigment Blue 15:3, Pigment Blue 15:4, Pigment Blue 16, Pigment Blue 22, Pigment Blue 60, Vat Blue 4, and Vat Blue 60.

Examples of the white pigment include: sulfuric acid salts of alkaline earth metals such as barium sulfate; carbonic acid salts of alkaline earth metals such as calcium carbonate; silica such as fine silicic acid powder and synthetic silicic acid salts; calcium silicate; alumina; alumina hydrate; titanium oxide; zinc oxide; talc; and clay.

<<Polymerization Inhibitor>>

Examples of the polymerization inhibitor include 4-methoxy-1-naphthol, methylhydroquinone, hydroquinone, t-butylhydroquinone, di-t-butylhydroquinone, methoquinone, 2,2'-dihydroxy-3,3'-di(α-methylcyclohexyl)-5,5'-dimethyl-diphenylmethane, p-benzoquinone, di-t-butylbutyl diphenylamine, 9,10-di-n-butoxyanthracene, 4,4'-[1,10-dioxo-1,10-decandiylbis(oxy)]bis[2,2,6,6-tetramethyl]-1-piperidinyloxy.

<<Surfactant>>

The surfactant is appropriately selected depending on the intended purpose without any limitation, and examples thereof include a higher fatty acid-based surfactant, a silicone-based surfactant, and a fluorine-based surfactant.

The viscosity of the photopolymerizable inkjet ink at 25° C. is preferably 2 mPa·s to 150 mPa·s, more preferably 5 mPa·s to 18 mPa·s. In the case an inkjet ejection head has a function of adjusting temperature is used and the viscosity of the ink is excessively high at 25° C., the head is appropriately heated to reduce the viscosity of the ink. In this case, assuming that the heating condition is 45° C. or 60° C., the viscosity of the ink at 45° or 60° C. is preferably 5 mPa·s to 18 mPa·s.

(Ink Cartridge)

The ink cartridge of the present invention contains a container, and the photopolymerizable inkjet ink of the present invention housed in the container. With this form, users do not have to directly touch the ink during operations such as exchange of the ink, and thus they do not need to concern about staining of their fingers, hands or clothes. In addition, it is possible to prevent interfusion of foreign matter such as dust into the ink.

The container is not particularly limited, and a shape, structure, size, and material thereof can be appropriately selected depending on the intended purpose. For example, the container is preferably selected from those having an ink bag formed of an aluminum laminate film, or a resin film.

Figure 1:
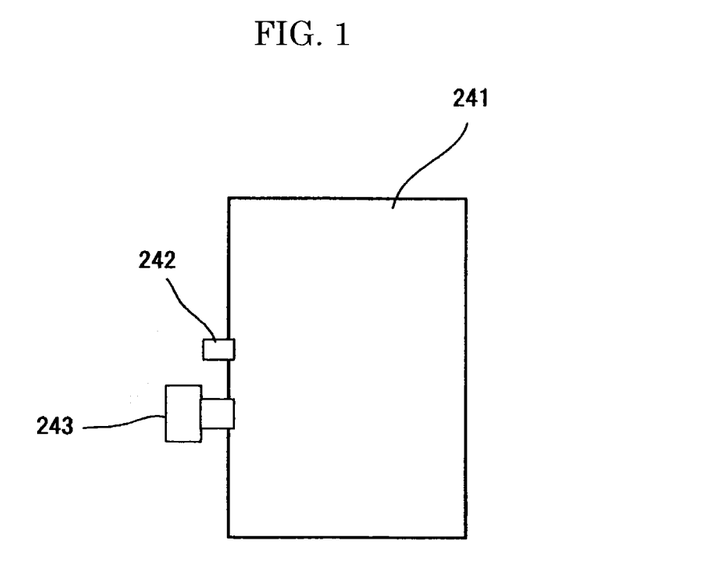
FIG. 1 is a schematic diagram illustrating one example of an ink bag of an ink cartridge.
Figure 2:
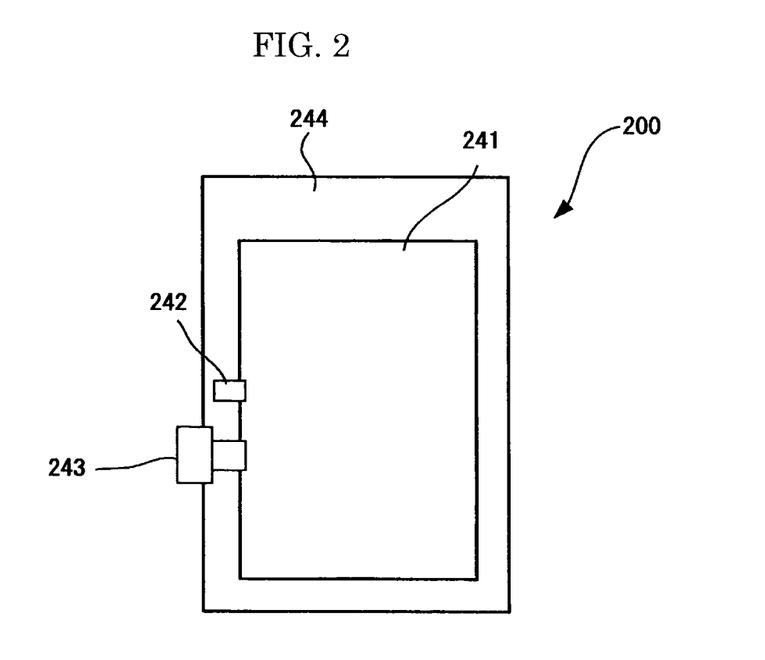
FIG. 2 is a schematic diagram illustrating one example of an ink cartridge housing an ink bag therein.

The ink cartridge is explained with reference to FIGS. 1 and 2. FIG. 1 is a schematic diagram illustrating one example of the ink bag 241 of the ink cartridge, and FIG. 2 is a schematic diagram illustrating the ink cartridge 200 housing the ink bag 241 of FIG. 1 in the cartridge case 244 thereof.

As illustrated in FIG. 1, the ink bag 241 is filled with the ink by injecting the ink from an ink inlet 242. After removing the air present inside the ink bag 241, the ink inlet 242 is sealed by fusion bonding. At the time of use, a needle attached to the main body of the device is inserted into an ink outlet 243 formed of a rubber member to supply the ink to the device. The ink bag 241 is formed of a wrapping member, such as an air non-permeable aluminum laminate film. As illustrated in FIG. 2, the ink bag 241 is typically housed in a plastic cartridge case 244, which is then detachably mounted in use to various inkjet recording devices as the ink cartridge 200.

The ink cartridge of the present invention is appropriately selected depending on the intended purpose without any limitation, but the ink cartridge is preferably detachably mounted in an inkjet recording device. As a result of this, refill or replacement of the ink can be simplified, and workability can be improved.

(Inkjet Recording Device)

The inkjet recording device of the present invention contains a unit configured to house the photopolymerizable inkjet ink of the present invention, a unit configured to eject the photopolymerizable inkjet ink onto a surface of a recording medium through an inkjet recording system, to thereby form an image, and a unit configured to apply activation energy rays to the image to cure the photopolymerizable inkjet ink, and may further contain other units, according to the necessity.

Examples of the unit configured to house the photopolymerizable inkjet ink of the present invention include an ink tank.

Examples of the method for ejecting the photopolymerizable inkjet ink include a continuous jet system, and an on-demand system. Examples of the on-demand system include a piezo system, a thermal system, and an electrostatic system.

Examples of the unit configured to apply activation energy rays to the image to cure the photopolymerizable inkjet ink include a UV irradiation device.

Figure 3:
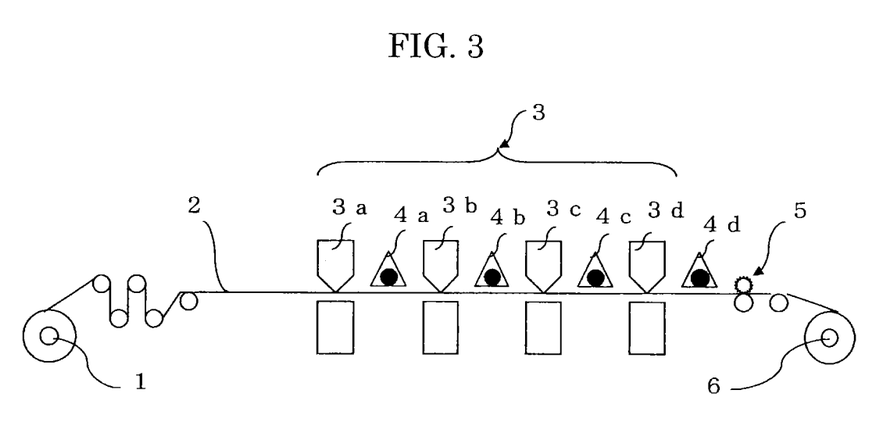
FIG. 3 is a schematic diagram illustrating one example of an inkjet recording device.

FIG. 3 is a schematic diagram illustrating one example of the inkjet recording device.

FIG. 3 illustrates an embodiment where a color image is formed by feeding a printing base 2 (transported from left to right in the diagram) from a printing base supply roll 1, ejecting the ink of each color (yellow, magenta, cyan, or black) by a printing unit 3 (for example, composed of a yellow printing unit 3a, magenta printing unit 3b, cyan printing unit 3c, and black printing unit 3d), applying light (UV light) from a UV light source (a light source for curing) 4a, 4b, 4c, or 4d per every printing process to cure. The printing units 3a, 3b, 3c, 3d are each equipped with a heating system at an ink ejecting section, in order to reduce viscosity of the ink when the viscosity of the ink is excessively high, and equipped with a cooling system at a base holding section (a section that is upper or lower side of the base in FIG. 3) in order to optionally cool the base in a direct or indirect manner. In the case here the ink is heated and ejected, and a print area of the previously printed color is small and transporting speed is slow, the base is maintained at adjacent to room temperature by natural cooling for a color printed later. In the case where a printing area of the color previously printed is large or the transporting speed is fast, however, the temperature of the base is increased. Therefore, it is expected that image formation is adversely affected by variations in actions of each color, such as wetting and spread of ink droplets landed on the base or previously printed ink. Accordingly, the cooling system configured to retain the temperature of the base to around room temperature may be provided according to the necessity.

As for the printing base 2, paper, a film, a metal or a composite material thereof is used. Although the printing base 2 in the form of a roll is illustrated in FIG. 3, the printing base 2 may be in the form of a sheet. Moreover, printing may be not only one-sided printing, but also double-sided printing.

In high speed printing, high curability can be attained by applying ultraviolet rays every time each color is printed. Energy saving and cost reduction can be realized, for example, by lowering output of 11V ray sources 4a, 4b, 4c or omitting the UV ray sources to apply a sufficient dose of UV rays with 4d at once after printing a plurality of colors. Alternatively, for realizing energy saving and cost reduction, LED light sources, which have recently been used practically for printing of photopolymerizable inks, may be used instead of conventionally used light sources such as high-pressure mercury lamps and metal halide lamps.

In FIG. 3, reference numeral 5 denotes a processing unit and reference numeral 6 denotes a wind-up roll for printed products.

EXAMPLES

The present invention will be concretely explained through Examples hereinafter, but Examples shall not be construed as to limit the scope of the present invention.

Examples 1 to 8 and Comparative Examples 1 to 4

Photopolymerizable inkjet inks of Examples 1 to 4, 6 to 8, and Comparative Examples 1 to 4 were each prepared by measuring materials depicted in Tables 3 to 6 to the predetermined amounts, followed by mixing, and placing a stirring bar therein and stirring the mixture with a stirrer.

In Example 5, as depicted in Table 6, a photopolymerizable inkjet ink was obtained by blending carbon black "#10" manufactured by Mitsubishi Chemical Corporation and a dispersing agent "Solsperse 32000" manufactured by Lubrizol Japan Co. at a mass ratio of 3:1, and mixing by means of Dyno-Mill MULTI-LAB (manufactured by SHINMARU ENTERPRISES CORPORATION), and a homogenizer HG30 (manufactured by Hitachi Koki Co., Ltd.), followed by filtering.

The viscosity of each of the obtained photopolymerizable inkjet inks at 25° C. was measured by TV-22 VISCOMETER (manufactured by TOKI SANGYO CO., LTD.). The results are presented in Tables 3 to 6.

After filtering each of the obtained photopolymerizable inkjet inks with a fluororesin membrane filter having a pore size of 5 an aluminum pouch bag having a shape illustrated in FIG. 1 was charged with the ink, and hermetically sealed so as to avoid inclusion of air bubbles. The hermetically sealed pouch bag containing the ink was housed in a plastic cartridge as illustrated in FIG. 2. This cartridge was mounted to a casing adapted for housing it. In the casing, an ink flow channel was provided from the cartridge to a GEN4 head (product of Ricoh Printing Systems, Ltd.). The ink was jetted through the ink flow channel to form a solid coating film. Note that, in inkjet printing, the conditions were adjusted so that a thickness of the solid coating film was to be 30 µm. Various properties thereof were evaluated in the following manner. The results are presented in Tables 3 to 6.

<Evaluation>

The printed solid coating film produced on the commercially available polycarbonate film (Lupilon E-2000, manufactured by Mitsubishi Engineering-Plastics Corporation, thickness: 100 µm) was cured with light having a wavelength range corresponding to the UVA region, at the illuminance of 0.2 W/cm$^2$. The resultant was subjected to measurements of light dose required for curing, light fastness, odor sensory evaluation, and SI value. Note that, whether or not the film was sufficiently cured was confirmed by touching the film after applying UV light.

<Total Light Dose>

A total light dose for sufficiently curing the coating film was measured by means of a UV illuminometer (UV Power Pack, manufactured by EIT Inc.).

<Light Fastness (ΔE)>

The light fastness was measured in the following manner. The coating film was left to stand under light lit by a fluorescent lamp for capturing insects FL15BL (15W) manufactured by TOSHIBA LIGHTING & TECHNOLOGY CORPORATION for 72 hours. The color tone of the coating film before and after the test was measured by means of 938 spectrodensitometer manufactured by X-rite, and the degree of yellowing was calculated as the color tone difference ΔE.

<Odor Sensory Evaluation>

The odor sensory evaluation was performed in the following manner. The odor of the cured coating film was relatively judged by 10 panelists, and judged with 10 levels from 1 (worst) to 10 (most excellent).

<Evaluation of SI Value>

The safety evaluated was performed as follows. The ink that was negative for skin sensitization or had the SI value of less than 3 was evaluated as A, and the ink that was positive for skin sensitization, or had SI value of 3 or greater, or was marked with R43 was evaluated as B.

<<Evaluation Method of SI Value>>

According to the skin sensitization test of local lymph node assay (LLNA) specified in OECD test guideline 429, the SI value was measured in the following manner.

[Test Material]

<<Positive Control>>

As for a positive control, α-hexylcinnamaldehyde (HCA; batch number CDR4225, manufactured by Wako Pure Chemical Industries, Ltd.) was used.

<<Vehicle>>

As for a vehicle, a mixture containing the following acetone and olive oil in a volume ratio of 4:1 was used.

Acetone (manufactured by Wako Pure Chemical Industries, Ltd.)

Olive oil (manufactured by Fudimi Pharmaceutical Co., Ltd.)

<<Animals Used>>

Before treated with the test substances, the positive control or the vehicle control, female mice were acclimated for 8 days including 6-day quarantine. No abnormalities were found in all the mice (used animals) during the quarantine/acclimation period. Based on the body weights measured 2 days before the initiation of sensitization, they were categorized into 2 groups (4 mice/group) by the body weight stratified random sampling method so that the body weight of each individual was within ±20% of the average body weight of all the individuals. Each of the used animals was 8 weeks old to 9 weeks old at the time of the initiation of sensitization. The individuals remaining after the categorization were excluded from the test.

The used animals were individually identified by application of an oil-based ink to their tale throughout the test period, and also their cages were labeled for identification.

Throughout the housing period including the quarantine/acclimation period, the used animals were housed in an animal room with barrier system, which was set as follows: 21° C. to 25° C. in temperature, 40% to 70% in relative humidity, 10 times/hour to 15 times/hour in frequency of air circulation, and a 12 hour-interval lighting cycle (lighting from 7:00 to 19:00).

The housing cages used were those made of polycarbonate, and four animals were housed in each cage.

The used animals were given ad libitum solid feed for laboratory animals MF (product of Oriental Yeast Co., Ltd.). Also, using a water-supply bottle, the used animals were given ad libitum tap water in which sodium hypochlorite (PURELOX, product of OYALOX Co., Ltd.) had been added so that the chlorine concentration was about 5 ppm. Bedding used was SUNFLAKE (fir tree, shavings obtained with a power planer) (product of Charles River Inc.). The feed and all of the feeding equipments were sterilized with an autoclave (121° C., 30 min) before use.

The housing cage and the bedding were replaced with new ones at the times of the categorization and the removal of the auricular lymph node (i.e., the time when the animals were transferred from the animal room), and the water-supply bottle and rack were replaced with new ones at the time of the categorization.

[Test Method]

<<Group Composition>>

The group compositions used in the measurement of the Si value are shown in Table 1.

TABLE 1

| Test group | Sensitization substance | Sensitization dose (μL/auricle) | Times of sensitization | Number of animals (animal No.) |
|---|---|---|---|---|
| Vehicle control group | Vehicle only | 25 | Once/day × 3 days | 4 (1-4) |
| Positive control group | 25.0% HCA | 25 | Once/day × 3 days | 4 (5-8) |

[Preparation]

<<Test Substance>>

Table 2 shows the amount of the test substance. The test substance was weighed in a measuring flask, and the volume of the test substance was adjusted to 1 mL with the vehicle. The thus-prepared test substance preparation was placed in a light-shielded airtight container (made of glass).

TABLE 2

| | Concentration after adjustment (w/v %) | Mass of test substance (g) |
|---|---|---|
| Test substance | 50.0 | 0.5 |

<<Positive Control Substance>>

About 0.25 g of HCA was accurately weighed, and the vehicle was added to the HCA to have the volume of 1 mL, to thereby prepare a 25.0w/v % solution. The thus-prepared positive control substance preparation was placed in a light-shielded airtight container (made of glass).

<<BrdU>>

In a measuring flask, 200 mg of 5-bromo-2'-deoxyuridine (BrdU, product of NACALAI TESQUE, INC.) was accurately weighed in a measuring flask. Then, physiological saline (product of OTSUKA PHARMACEUTICAL CO., LTD.) was added to the measuring flask, and dissolved through application of ultrasonic waves. Thereafter, the volume of the resultant solution was adjusted to 20 mL to prepare a 10 mg/mL solution (BrdU preparation). The BrdU preparation was sterilized through filtration with a sterilized filtration filter and placed in a sterilized container.

<<Preparation Day and Storage Period>>

The positive control preparation was prepared on the day before the initiation of sensitization, and stored in a cold place except in use. The vehicle and the test substance preparations were prepared on the day of sensitization. The BrdU preparation was prepared 2 days before administration and stored in a cold place until the day of administration.

[Sensitization and Administration of BrdU]

<<Sensitization>>

Each of the test substance preparations, the positive control preparation, and the vehicle was applied to both the auricles of each of the used animals by 25 μL. For the application, a micropipetter was used. This treatment was performed once a day for three consecutive days.

<<Administration of BrdU>>

About 48 hours after the final sensitization, the BrdU preparation (0.5 mL) was intraperitoneally administered once to each of the used animals.

[Observation and Examination]

<<General Conditions>>

All the used animals used for the test were observed once or more times a day from the day of the initiation of sensitization to the day of the removal of the auricular lymph node (i.e., the day when the animals were transferred from the animal room). Notably, the observation day was counted from the day of the initiation of sensitization being regarded as Day 1.

<<Measurement of Body Weights>>

The body weight of each of the used animals was measured on the day of the initiation of sensitization and on the day of the removal of the auricular lymph node (i.e., the day when the animals were transferred from the animal room). Also, the average of the body weights and the standard error thereof were calculated for each group.

<<Removal of Auricular Lymph Node and Measurement of Weight Thereof>>

About 24 hours after the administration of BrdU, the used animals were allowed to undergo euthanasia, and their auricular lymph nodes were sampled. The surrounding tissue of each auricular lymph node was removed, and the auricular lymph nodes from both the auricles were collectively weighed. Also, the average of the weights of the auricular lymph nodes and the standard error thereof were calculated for each group. After the measurement of the weights, the auricular lymph nodes of each individual were stored in a frozen state using a BIO MEDICAL FREEZER set to −20° C.

<<Measurement of BrdU Intake>>

After returning the auricular lymph nodes to room temperature, the auricular lymph nodes were mashed with the gradual addition of physiological saline, and suspended therein. The thus-obtained suspension was filtrated and then dispensed into the wells of a 96-well microplate, with 3 wells being used per individual. The thus-dispensed suspensions were measured for intake of BrdU by the ELISA method. The reagents used were those of a commercially available kit (Cell Proliferation ELISA, BrdU colorimetric, Cat. No. 1647229, product of Roche Diagnostics Inc.). A multiplate reader (FLUOSTAR OPTIMA, product of BMG LABTECH Inc.) was used to measure the absorbance of each well (OD: 370 nm to 492 nm, the intake of BrdU), and the average of the absorbance of the 3 wells for each individual was used as the measurement of BrdU for the individual.

<<Calculation of Stimulation Index (SI)>>

As shown in the following formula, the measurement of BrdU intake for each individual was divided by the average of the measurements of BrdU intake in the vehicle control group to calculate the SI value for the individual. The SI value of each test group was the average of the SI values of the individuals. Also, the standard error of the SI values was calculated for each test group. Notably, the SI value was rounded at the second decimal place and shown up to the first decimal place.

$$SI = \frac{\text{Average of measurements of } BrdU \text{ intake for each individual (average of 3 wells)}}{\text{Average of measurements of } BrdU \text{ intake in the vehicle control group (average of 4 animals)}}$$

TABLE 3

| Substance (parts by mass) | | Ex. 1 | Ex. 2 | Ex. 3 |
|---|---|---|---|---|
| Photo-polymerizable monomer | 2G | 70 | 70 | 70 |
| | DPCA60 | 30 | 30 | 30 |
| | TMPT-3EO | — | — | — |
| | Trimethylol propane triacrylate | — | — | — |
| | Hexamethylene diacrylate | — | — | — |
| Colorant | Carbon black | — | — | — |
| Photo-polymerization initiator | Compound 1 | 10 | — | — |
| | Compound 2 | — | 10 | — |
| | Compound 3 | — | — | 10 |
| | Irgacure 184 | — | — | — |
| | Irgacure 819 | — | — | — |
| Viscosity (25° C., mPa · s) | | 31 | 34 | 35 |
| Total light dose (mJ/cm$^2$) | | 1,200 | 1,200 | 1,300 |
| ΔE | | 3 | 4 | 4 |
| Odor | | 10 | 10 | 7 |
| Safety | | A | A | A |

TABLE 4

| Substance (parts by mass) | | Comp. Ex. 1 | Comp. Ex. 2 |
|---|---|---|---|
| Photo-polymerizable monomer | 2G | 70 | 100 |
| | DPCA60 | 30 | — |
| | TMPT-3EO | — | — |
| | Trimethylol propane triacrylate | — | — |
| | Hexamethylene diacrylate | — | — |
| Colorant | Carbon black | — | — |
| Photo-polymerization initiator | Compound 1 | — | 10 |
| | Compound 2 | — | — |
| | Compound 3 | — | — |
| | Irgacure 184 | 10 | — |
| | Irgacure 819 | — | — |
| Viscosity (25° C., mPa · s) | | 22 | 8.3 |
| Total light dose (mJ/cm$^2$) | | 2,000 | 10,000 |
| ΔE | | 12 | 12 |
| Odor | | 1 | 6 |
| Safety | | A | A |

TABLE 5

| Substance (parts by mass) | | Comp. Ex. 3 | Ex. 4 | Comp. Ex. 4 |
|---|---|---|---|---|
| Photo-polymerizable monomer | 2G | — | 50 | — |
| | DPCA60 | 100 | 30 | — |
| | TMPT-3EO | — | 20 | — |
| | Trimethylol propane triacrylate | — | — | 70 |
| | Hexamethylene diacrylate | — | — | 30 |
| Colorant | Carbon black | — | — | — |
| Photo-polymerization initiator | Compound 1 | 10 | 10 | 10 |
| | Compound 2 | — | — | — |
| | Compound 3 | — | — | — |
| | Irgacure 184 | — | — | — |
| | Irgacure 819 | — | — | — |
| Viscosity (25° C., mPa · s) | | 1300 | 52 | 31 |
| Total light dose (mJ/cm$^2$) | | * | 1,200 | 1,200 |
| ΔE | | * | 4 | 3 |
| Odor | | * | 9 | 9 |
| Safety | | A | A | B |

* Not evaluated, as it could not be ejected due to high viscosity.

TABLE 6

| Substance (parts by mass) | | Ex. 5 | Ex. 6 | Ex. 7 | Ex. 8 |
|---|---|---|---|---|---|
| Photo-polymerizable monomer | 2G | 70 | 70 | 70 | 70 |
| | DPCA60 | 30 | 30 | 30 | 30 |
| | TMPT-3EO | — | — | — | — |

TABLE 6-continued

| Substance (parts by mass) | | Ex. 5 | Ex. 6 | Ex. 7 | Ex. 8 |
|---|---|---|---|---|---|
| | Trimethylol propane triacrylate | — | — | — | — |
| | Hexamethylene diacrylate | — | — | — | — |
| Colorant | Carbon black | 0.05 | — | — | — |
| Photo-polymerization initiator | Compound 1 | 10 | 20 | 24 | 8 |
| | Compound 2 | — | — | — | — |
| | Compound 3 | — | — | — | — |
| | Irgacure 184 | — | — | — | — |
| | Irgacure 819 | — | — | — | — |
| Viscosity (25° C., mPa · s) | | 26 | 30 | 32 | 24 |
| Total light dose (mJ/cm$^2$) | | 1,200 | 1,200 | 1,200 | 1,500 |
| ΔE | | 3 | 3 | 5 | 3 |
| Odor | | 10 | 10 | 8 | 8 |
| Safety | | A | A | A | A |

The details of the compounds in Tables 3 to 6 are as follows.

The value in parentheses at the end is an "SI" value as measured by the LLNA test, "no" in the parentheses means that the product is evaluated as "negative for skin sensitization" or "no skin sensitization" in the MSDS (Material Safety Data Sheet) as described in (2) earlier, and "yes" means that the product is evaluated as "positive for skin sensitization" or "skin sensitization" in the MSDS, and indicated with the descriptions in the hazard classification in EU. DIRECTIVE 67/548/EEC.

—Photopolymerizable Monomer—

Diethylene glycol dimethacrylate, "2G" manufactured by Shin-Nakamura Chemical Co., Ltd. (SI value: 1.1)

Caprolactone-modified dipentaerythritol hexaacrylate, "DPCA60" manufactured by NIPPON KAYAKU Co., Ltd. (SI value: 1.0)

Ethyleneoxide-modified trimethylolpropane trimethacrylate, "TMPT-3EO" manufactured by Shin-Nakamura Chemical Co., Ltd. (SI value: 1.0)

Trimethylolpropane triacrylate, "M309" manufactured by TOAGOSEI CO., LTD. (marked as R43, which indicates that it is a skin sensitizing material, in the hazard classification in EU. DIRECTIVE 67/548/EEC)

Hexamethylene diacrylate, "A-HD-N" manufactured by Shin-Nakamura Chemical Co., Ltd. (marked as R43, which indicates that it is a skin sensitizing material, in the hazard classification in EU. DIRECTIVE 67/548/EEC)

—Colorant—

A mixture obtained by blending carbon black "#10" manufactured by Mitsubishi Chemical Corporation with a dispersing agent "Solsperse 32000" at a mass ratio of 3:1

—Photopolymerization Initiator—

1-hydroxycyclohexylphenyl ketone, "Irgacure 184" manufactured by BASF (no: evaluated in MSDS)

Bis(2,4,6-trimethylbenzoyl)-phenylphosphone oxide, "Irgacure 819" manufactured by BASF (yes: evaluated in MSDS)

Compound 1 represented by the following structural formula:

Compound 2 represented by the following structural formula:

Compound 3 represented by the following structural formula:

It was confirmed from the results of Examples 1, 2, and 3 that the photopolymerizable monomer using the photopolymerization initiator represented by the general formula (1) had less odor and moreover yellowing upon application of light regardless of a functional group of the compound for use, and could form a coating film that had sufficient strength.

On the other hand, it was confirmed from the result of Comparative Example 1 that the photopolymerizable inkjet ink, which does not use the photopolymerization initiator represented by the general formula (1) had significant odor and yellowing, and strength of the coating film thereof was significantly reduced when the coating film was cured with the predetermined light dose.

Moreover, it was confirmed from the results of Comparative Examples 2 and 3 that the photopolymerizable inkjet ink, in which only 2G was blended without blending DPCA60 was difficult to be cured at the predetermined light dose, and the photopolymerizable inkjet ink, in which only DPCA 60 was blended without blending 2G increased the viscosity thereof to the level that the ink cannot be ejected as inkjets. Therefore, it was confirmed that it was necessary to use at least 2G and DPCA60 in combination.

From the results of Example 4 and Comparative Example 4, moreover, it was confirmed that a sufficient coating film could be attained when monomers other than 2G and DPCA60 were used in combination. However, other than 2G and DPCA60, use of the monomers having negative safety in combination could attain a sufficient coating film, but safety and sufficient strength of the coating film could not be attained at the same time.

Furthermore, it was confirmed from the result of Example 5 that the photopolymerizable inkjet ink containing a colorant, as well as 2G, DPCA60, and the photopolymerization initiator represented by the general formula (1) could form a coating film having sufficient strength, if a type of the photopolymerization initiator for use was appropriately selected.

The embodiments of the present invention are, for example, as follows:

<1> A photopolymerizable inkjet ink, containing:
diethylene glycol dimethacrylate;
caprolactone-modified dipentaerythritol hexaacrylate; and
a photopolymerization initiator represented by the following general formula (1):

General Formula (1)

where $X_1$ is represented by the following general formula (1-1), and $X_2$ is represented by the following general formula (1-2):

General Formula (1-1)

General Formula (1-2)

where $R_1$ to $R_4$ are each independently a C1-C6 alkyl group, and $R_1$ and $R_2$ may be linked to form a ring, and $R_3$ and $R_4$ may be linked to form a ring; $Z_1$ and $Z_2$ is —$NR_5R_6$ or $OR_7$; $R_5$ and $R_6$ are each independently a C1-C6 alkyl group, and $R_5$ and $R_6$ may be linked to form a ring; and $R_7$ is a hydrogen atom, a methyl group, or a trimethylsilyl group.

<2> The photopolymerizable inkjet ink according to <1>, wherein a mass ratio (A:B) of the diethylene glycol dimethacrylate (A) to the caprolactone-modified dipentaerythritol hexaacrylate (B) is 50:50 to 70:30.

<3> The photopolymerizable inkjet ink according to any of <1> or <2>,
wherein the photopolymerization initiator represented by the general formula (1) is at least one selected from compounds represented by the following structural formulae:

<4> The photopolymerizable inkjet ink according to any one of <1> to <3>, wherein an amount of the photopolymerization initiator represented by the general formula (1) is 10 parts by mass to 20 parts by mass, relative to 100 parts by mass of a total amount of the photopolymerizable monomers.

<5> An ink cartridge, containing:
a container; and
the photopolymerizable inkjet ink according to any one of <1> to <4> housed in the container.

<6> An inkjet recording device, containing:
a unit configured to house the photopolymerizable inkjet ink according to any one of <1> to <4>;
a unit configured to eject the photopolymerizable inkjet ink onto a surface of a recording medium through an inkjet recording system, to thereby form an image; and
a unit configured to apply activation energy rays to the image to cure the photopolymerizable inkjet ink.

This application claims priority to Japanese application No. 2013-141287, filed on Jul. 5, 2013 and incorporated herein by reference.

What is claimed is:

1. A photopolymerizable inkjet ink, comprising:
diethylene glycol dimethacrylate;
caprolactone-modified dipentaerythritol hexaacrylate; and
a photopolymerization initiator of general formula (1):

General Formula (1)

wherein $X_1$ is represented by general formula (1-1), and $X_2$ is represented by general formula (1-2):

General Formula (1-1)

General Formula (1-2)

wherein $R_1$ to $R_4$ are each independently a $C_1$-$C_6$ alkyl group, and $R_1$ and $R_2$ may be linked to form a ring, and $R_3$ and $R_4$ may be linked to form a ring; $Z_1$ and $Z_2$ is —$NR_5R_6$ or $OR_7$; $R_5$ and $R_6$ are each independently a $C_1$-$C_6$ alkyl group, and $R_5$ and $R_6$ may be linked to form a ring; and $R_7$ is a hydrogen atom, a methyl group, or a trimethylsilyl group.

2. The photopolymerizable inkjet ink according to claim 1, wherein a mass ratio (A:B) of the diethylene glycol dimethacrylate (A) to the caprolactone-modified dipentaerythritol hexaacrylate (B) is from 50:50 to 70:30.

3. The photopolymerizable inkjet ink according to claim 1, wherein the photopolymerization initiator of general formula (1) is at least one selected from compounds represented by the following structural formulae:

4. The photopolymerizable inkjet ink according to claim 1, wherein an amount of the photopolymerization initiator of general formula (1) is 10 parts by mass to 20 parts by mass, relative to 100 parts by mass of a total amount of the photopolymerizable monomers.

5. An ink cartridge, comprising:
a container; and
a photopolymerizable inkjet ink housed in the container,
wherein the photopolymerizable inkjet ink comprises:
diethylene glycol dimethacrylate;
caprolactone-modified dipentaerythritol hexaacrylate; and
a photopolymerization initiator of general formula (1):

General Formula (1)

wherein $X_1$ is represented by general formula (1-1), and $X_2$ is represented by general formula (1-2):

General Formula (1-1)

General Formula (1-2)

wherein $R_1$ to $R_4$ are each independently a $C_1$-$C_6$ alkyl group, and $R_1$ and $R_2$ may be linked to form a ring, and $R_3$ and $R_4$ may be linked to form a ring; $Z_1$ and $Z_2$ is —$NR_5R_6$ or $OR_7$; $R_5$ and $R_6$ are each independently a $C_1$-$C_6$ alkyl group, and $R_5$ and $R_6$ may be linked to form a ring; and $R_7$ is a hydrogen atom, a methyl group, or a trimethylsilyl group.

6. An inkjet recording device, comprising:
a unit configured to house a photopolymerizable inkjet ink;
a unit configured to eject the photopolymerizable inkjet ink onto a surface of a recording medium through an inkjet recording system, to thereby form an image; and
a unit configured to apply activation energy rays to the image to cure the photopolymerizable inkjet ink,
wherein the photopolymerizable inkjet ink comprises:
diethylene glycol dimethacrylate,
caprolactone-modified dipentaerythritol hexaacrylate, and
a photopolymerization initiator of general formula (1):

General Formula (1)

wherein $X_1$ is represented by general formula (1-1), and $X_2$ is represented by general formula (1-2):

General Formula (1-1)

General Formula (1-2)

wherein $R_1$ to $R_4$ are each independently a $C_1$-$C_6$ alkyl group, and $R_1$ and $R_2$ may be linked to form a ring, and $R_3$ and $R_4$ may be linked to form a ring; $Z_1$ and $Z_2$ is —$NR_5R_6$ or $OR_7$; $R_5$ and $R_6$ are each independently a $C_1$-$C_6$ alkyl group, and $R_5$ and $R_6$ may be linked to form a ring; and $R_7$ is a hydrogen atom, a methyl group, or a trimethylsilyl group.

* * * * *